(No Model.)
J. J. FRAIKIN.
CULTIVATOR.
No. 330,687. Patented Nov. 17, 1885.
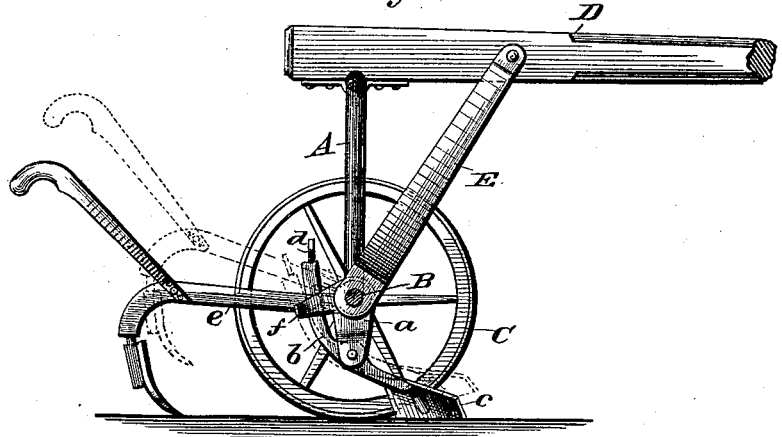
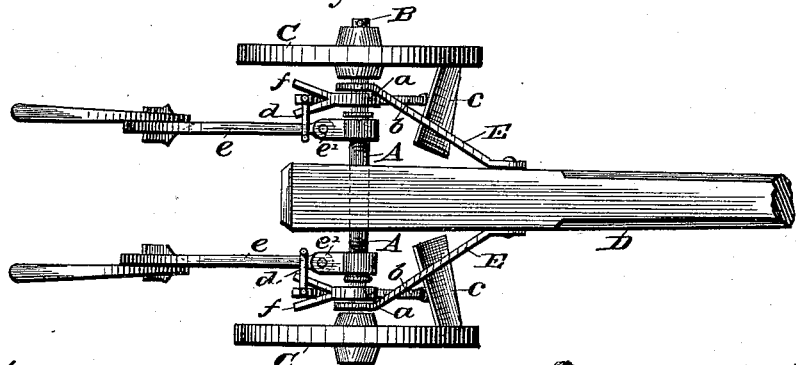
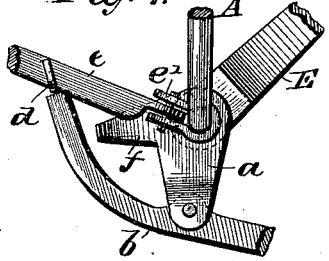
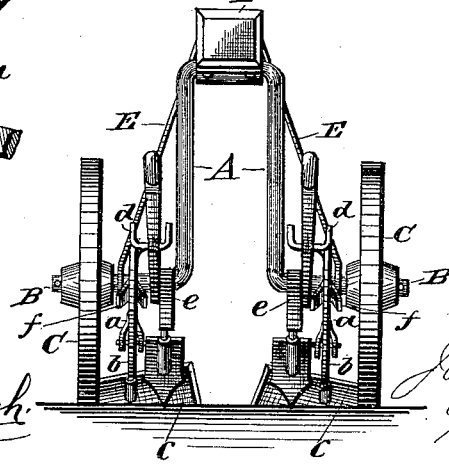
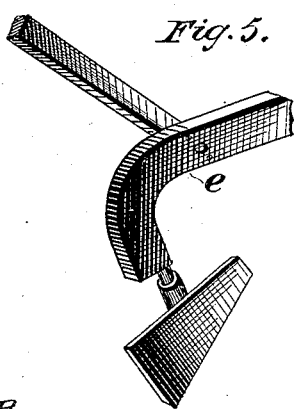
WITNESSES
INVENTOR
John J. Fraikin
by Franck D. Johns
Attorney

UNITED STATES PATENT OFFICE.

JOHN J. FRAIKIN, OF FORT WAYNE, INDIANA.

CULTIVATOR.

SPECIFICATION forming part of Letters Patent No. 330,687, dated November 17, 1885.

Application filed September 1, 1885. Serial No. 175,871. (No model.)

*To all whom it may concern:*

Be it known that I, JOHN J. FRAIKIN, a citizen of the United States, residing at Fort Wayne, in the county of Allen and State of Indiana, have invented certain new and useful Improvements in Cultivators; and I do hereby declare the following to be a full, clear, and exact description of the invention, such as will enable others skilled in the art to which it appertains to make and use the same.

My invention relates to that class of agricultural implements or machines known as "wheel-cultivators;" and the invention consists in combining scrapers with plows, diggers, or shovels, so that said scrapers will precede the latter in their operation.

The invention further consists in pivoting the scrapers and providing means whereby, when such is desired, both the plow and the scraper can be supported above the ground, and consequently out of operative position with relation thereto.

The invention also consists in certain details of construction whereby the construction of this class of machines or implements is simplified and cheapened and their operation rendered more effective.

In the accompanying sheet of drawings, in which like letters designate corresponding parts in the different figures, Figure 1 represents a view in side elevation of a machine embodying my invention; Fig. 2, a top plan view with parts broken away. Fig. 3 is a rear elevation, and Figs. 4 and 5 are details.

The letter A designates an arched axle, which is fitted at either side with spindles B, and upon which the carrying-wheels C are mounted. The tongue D is secured in any suitable manner to the upper portion of this arched axle, and braces E, extending between and secured to the said tongue and spindles, serve as additional means for sustaining the tongue. Rigid standards $a$, projecting downwardly from the spindles, have pivotally secured to them the curved beams $b$, which are provided at their lower ends with scrapers $c$, and at their upper ends with bent fingers $d$, projecting at right angles therefrom, as shown, and for the purpose to be hereinafter explained. Projecting rearwardly from the spindles, and in the plane of the standards $a$, are arms $f$, which are so constructed and separated as to receive and guide the upper ends of the scraper-beam $b$. Plow, shovel, or digger-beams $e$, having a swivel or universal-joint connection, $e'$, with the spindles, extend rearwardly therefrom. The tools are removably connected with the beams $b$ and $e$, in order that those of different sizes or other kinds may be substituted. Upon the upper sides of the rear ends of the beams $e$ are secured plow-handles of ordinary construction, for the purpose of directing the same.

When it is desired to carry the apparatus over the ground without working the same, it is only necessary to turn the beam $b$ to about a horizontal position, when the beam $e$ may be lifted and permitted to rest upon the finger $d$, as shown in dotted lines, Fig. 1, the standards $a$ being so constructed or fitted with a stop as to permit the beam $b$ to be turned only to substantially the position shown by the dotted lines.

I do not limit myself to the exact construction of details shown, as the machine is susceptible of obvious modifications without departing from the gist of my invention.

What I claim, and desire to secure by Letters Patent, is—

1. In a wheel-cultivator, the arched axle provided with journals or spindles at either side, scraper-beams pivotally secured thereto and provided at their upper ends with the fingers described, in combination with the rearwardly-extending plow or shovel beams, adapted to be seated in the fingers of the scraper-beams and thus raise both from the ground, substantially as shown and described.

2. In a wheel-cultivator, the arched axle provided with journals or spindles at either side, scraper-beams pivotally secured thereto and provided at their upper ends with the fingers described, and guide-arms for said pivoted scraper-beams, in combination with the rearwardly-extending plow or shovel beams, having a swivel or universal-joint connection with the axle and adapted to be seated in the fingers of the scraper-beams and thus raise both from the ground, substantially as shown and described.

In testimony whereof I affix my signature in presence of two witnesses.

JOHN J. FRAIKIN.

Witnesses:
FRED V. GRAHAM,
T. W. WILSON.